Figure 1:
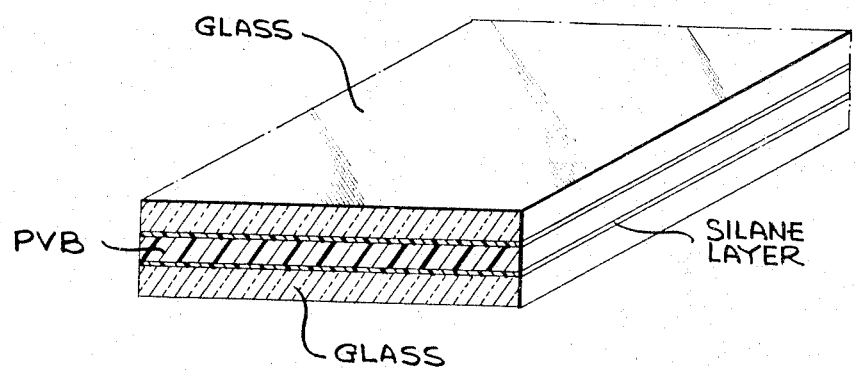

INVENTORS
JAMES J. HAZDRA
& HUBERT M. LONTZ

United States Patent Office 3,341,399
Patented Sept. 12, 1967

3,341,399
GLASS TO GLASS ADHESIVES
James J. Hazdra, Joilet, Ill., and Hubert M. Lontz, Brockway, Pa., said Hazdra assignor to Brockway Glass Company, Inc., Brockway, Pa., a corporation of New York
Filed Nov. 16, 1966, Ser. No. 594,818
22 Claims. (Cl. 161—193)

This application is a continuation-in-part of applicant's copending application Ser. No. 305,803, filed on Aug. 30, 1963, now abandoned.

This invention is directed to the bonding of glass surfaces by an adhesive layer comprising a combination of a triethoxysilane and a thermoplastic aldol condensation polymer. More specifically, this invention relates to the use of a triethoxysilane, e.g., gamma aminopropyl triethoxysilane in combination with polyvinyl butyral as an adhesive composition for securing together glass surfaces.

Heretofore, various silanes have been used as the initial coating for glass surfaces primarily in the application of coating glass fibers prior to impregnating them with a thermosetting resin. These resins, such as, for example, the polyesters, phenolics, epoxides, melamines and the like, have been used with various triethoxysilanes. Of these resins, however, the epoxy resins have been found to be very practical as an adhesive in preparing glass laminates. The use of the epoxy resins is restricted, however, because of their thermosetting characteristics to the application on the glass substrates in the form of a liquid and, therefore, require elaborate equipment in addition to their comparatively higher cost.

To avoid these problems, it has been found in accordance with this invention that the thermoplastic aldol resins may be used in combination with the triethoxysilanes as an adhesive for joining glass surfaces, such as laminates or the like, and have been found to have shear strengths comparable to those obtained by the use of the epoxy adhesives. The use of these aldol condensation resins in comparison to the resins used heretofore minimizes the initial cost of the materials and avoids the necessity of having to use liquid thermosetting resins. A particular aldol condensation resin which is useful for purposes of this invention may be prepared by the condensation of polyvinyl alcohol, for example, with the isomers of butyraldehyde.

The preferred condensation resin, for purposes of this invention, includes the polyvinyl butyral referred to hereinafter as PVB which has the advantage that it may be prepared in the form of films of 5 to 15 mils in thickness and in a variety of commercially useful colors. These films may be positioned between the glass surfaces which have been pretreated with the triethoxysilane and then heated to the flow point temperature of the butyral resin with pressure, e.g., approximately 15 p.s.i., until the surfaces of the glass adhere to one another. Since the PVB can be used in the form of films of the desired thickness, they can be precut to any size and placed easily in between the glass surfaces which are to be bound together. The use of dry films obviously facilitates the procedure in that no curing time is necessary as is in the case of the thermosetting resins, e.g., the epoxy resins.

The use of an epoxy resin, for example, in combination with an aminoalkyl triethoxysilane, requires that the silane be applied in the form of a solution onto the surfaces of the glass to be bonded together and that the epoxy resin be applied in the fluid state onto the treated surface of the glass prior to being cured. The uncured epoxy resins contain epoxy groups which react with the amino groups of the silane, thereby securing a bond between the treated glass surfaces. In comparison, the polyvinyl butyral lacks the reactive groups similar to the epoxy compounds but nevertheless, reacts with the triethoxysilanes and particularly the aminoalkyl triethoxysilanes to form a bond between the glass surfaces comparable in strength to that of the epoxy resins used in the same manner.

Accordingly, it is an object of this invention to provide a method of preparing assembled glass articles by coating at least two glass surfaces with an alcoholic solution of a triethoxysilane and subsequently applying a film of polyvinyl butyral between said surfaces, thereby causing the treated glass to form a bond.

It is another object of this invention to provide a composition which may be used as an adhesive in preparing laminates of glass structures.

It is another object of this invention to provide a method of bonding together glass surfaces characterized by high adhesion shear strengths which is obtained by utilizing a combination of a triethoxysilane and polyvinyl butyral as the adhesive composition.

These and other objects of the invention will become obvious from a further and more detailed description to follow.

It has been found that assembled glass articles, e.g., laminates of glass, can be obtained by coating at least two glass surfaces with an aqueous solution of a triethoxysilane containing small amounts of the lower alcohols such as methyl, ethyl, propyl, isopropyl or butyl alcohol and the like. The solution of the silane applied to the surface of the glass is heated at temperatures ranging from about 25° C. to 50° C. over periods of 2 to 48 hours. Thus, for example, as the reaction time between the silane and the surfaces of the glass increases from 2 to 48 hours, the temperature may be decreased from 50° C. to 25° C. Moreover, the reaction between the silane and the surfaces of the glass may take place at temperatures ranging from 100° C. to 200° C. for even lesser periods of time ranging from about 10 to 20 minutes. Thus, the amount of time in which the silane is permitted to react with the surface of the glass will increase as the reaction temperature decreases. Subsequent to the treatment of the glass surfaces with the silane, the polyvinyl butyral is placed between the surfaces of the glass, e.g., two glass laminates, and adhered together as a permanent bond by subjecting the glass structure to low pressure, e.g., 15 p.s.i., while being subjected to temperatures ranging from approximately 400–450° F. (204°–232° C.), which is the temperature referred to hereinafter as the flow point of the polyvinyl butyral. The glass articles prepared in accordance with this invention are characterized by having high shear strengths and high moisture resistance which are obtained by coating the treated surfaces of the glass with a solution of the triethoxysilane. This solution may contain up to about 0.5% by weight of the silane, e.g., aminopropyl triethoxysilane, in water, with small amounts of up to about 30% of a lower alcohol, such as methyl, ethyl, or isopropyl alcohol.

In a specific example of this invention, the solution used to treat the glass surface consisted essentially of a 30–70% by weight solution of ethyl alcohol in water with about 0.5% by weight of gamma aminopropyl triethoxysilane with the polyvinyl butyral being used in the form of layers having a thickness between 5 and 15 mils. When using the gamma aminoalkyl triethoxysilane, for example, as the treating agent for the surfaces of the glass, the polyvinyl butyral may be free of hydroxyl groups, whereas it is necessary to use polyvinyl butyral having up to 13 mol percent of hydroxyl groups in combination with other triethoxysilanes such as the alkyl or aryl triethoxysilanes.

The relative proportion of the polyvinyl butyral and the triethoxysilane used in preparing the adhesive bond between the glass surfaces may range from about 1:1 to 10:1 (PVB:silane).

Figure 2:
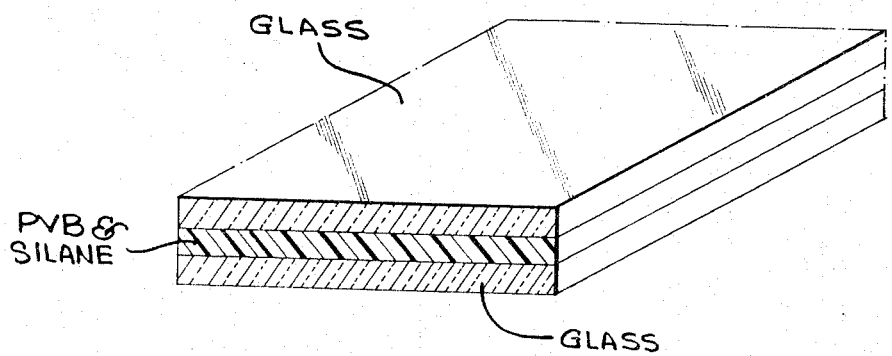

In addition to the adhesive composition, the present invention also encompasses the novel glass-adhesive-glass connection and the articles or structures obtained thereby. The method of preparing these glass connections or assemblies and the articles obtained therefrom are more particularly described in detail as set forth in the drawings, wherein:

FIGURE 1 is a cross-sectional corner of the glass connection of this invention; and FIGURE 2 illustrates a modification of the glass connection in a cross-sectional corner view.

Referring now to FIGURE 1, the first modification is shown wherein a bottom glass layer has coated on the upper surface thereof a silane, e.g., hydrolyzed gamma aminipropyl triethoxysilane, which has been treated under conditions which cause the silane to react with the surface of the glass as described in more detail hereinbelow. The polyvinyl butyral is bonded to the silane by a reaction of the amino groups with the silane. The uppermost surface of the polyvinyl butyral adhesive layer is contacted with a second silane layer, e.g., reacted residue of hydrolyzed gamma aminopropyl triethoxysilane, which has been reacted on the undersurface of the topmost layer. As an alternative, the polyvinyl butyral layer may contain a relatively small percentage, e.g., 1–10%, of the silane if desired.

In FIGURE 2 a modification of this invention is shown wherein the bottom glass layer is contacted directly with a mixture of PVB and the silane used in FIGURE 1. This mixture contacts the underside of the topmost glass layer and adhesively binds two layers together to form the glass-PVB-glass connection. Since the triethoxysilane is an amino propyl triethoxysilane, it is not necessary in this particular example to use a polyvinyl butyral which has hydroxyl groups. In other words, a PVB having no hydroxy groups may be used in combination with the aminoalkyl triethoxysilane.

As illustrated in FIGURES 1 and 2, various types of glass may be used in preparing the glass structures, the controlling factor being that the glass should exhibit a reaction with the triethoxysilane which may be characterized by the following structure:

(I)  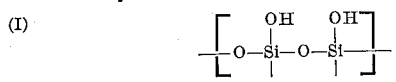

In addition, it is obviously important that the layers of glass have no obstructive film or impurities on the surface thereof which would prevent the silanes from reacting or uniting with the surface of the glass.

As a specific embodiment, the structure pointed out in the drawings was prepared by the following steps:

(1) A 0.5% by weight solution of gamma aminopropyl triethoxysilane in a 70:30 water to alcohol mixture was prepared by dissolving the silane in ethyl alcohol and then by diluting same with water until the ratios were obtained. The alcohol lowers the surface tension of the solution and provides better wetting onto a glass surface. Where desirable and where less wetting is necessary, increased proportions, up to 100% of water, may be used, with no alcohol.

(2) Two glass plates previously cleaned were dipped or sprayed with the composition described above to form a complete coating on at least one surface of each glass plate which is to be joined together. A monomolecular coating thickness is sufficient.

(3) The treated glass plates, e.g., the glass treated with the silane composition, is permitted to dry and react for a period of about 2 days at room temperature (25° C.). In lieu of the room temperature reaction, however, it is obvious that increased temperatures ranging from 50–200° C. may be used over shorter reaction periods of anywhere of from 2 hours at the lower temperature for periods of 10 to 20 minutes at the higher temperatures.

(4) A dry film of PVB having a thickness in the range of 5 to 15 mils and having an area equivalent to the area between the glass plates to be joined was placed between the silane-treated glass plate surfaces.

(5) The bond or connection between the treated glass surfaces was obtained by heating the structure to temperatures of about 275–300° F. for a period of about 15 seconds at a pressure of about 10–15 p.s.i., the pressure being applied for compacting the glass surfaces during the curing at the temperatures of 275–300° F. A temperature of 400° F. may be used over a shorter period of time. Likewise, higher temperatures between 400° and 450° F. are preferred for melting the polyvinyl butyral to its flow point when a small amount of plasticizer is present.

As previously indicated, the silane solution may be prepared by employing the lower alcohols having 1–8 carbon atoms per molecule which include, for example, methyl, ethyl, propyl, isoproyl, butyl, etc. The solution may be prepared by utilizing up to 30% of the lower alcohols in water or water alone may be used as the diluent. The primary function of the alcohol is to reduce the surface tension of the coating composition onto the surface of the glass. In addition, other triethoxysilanes may be used in place of the aminoalkyl triethoxysilanes. These may include, for example, methyl triethoxysilane, vinyl triethoxysilane, phenyl triethoxysilane, alkyl-substituted phenyl triethoxysilane, and various other alkyl and/or aryl triethoxysilanes having 1 to 8 carbon atoms in the alkyl or aryl group. In addition, other primary or secondary amine-substituted alkyl or aryl triethoxysilanes may be used wherein the alkyl or aryl group has from 1 to 8 carbon atoms.

As an alternative to the fourth step above, it was found possible to include a relatively small percentage of an aminoalkyl triethoxysilane with the PVB which constitutes the middle layer. Thus, for example, a film of PVB and the silane may be formed by dissolving about one mol of PVB in dioxane and then adding about 0.1 mol of the gamma aminopropyl triethoxysilane. The films are then obtained by removing the dioxane which are then employed in step (4) mentioned above.

The connections in the glass laminate structures produced by the above method may be employed, for example, in assembling glass articles such as adhesively securing handles of glass tumblers, joining parts of pedestal ware, e.g., candy or cake plates, joining parts of glass fuse plugs and the bonding of various parts of miscellaneous stem ware. In the adhesive bonding of a two-part fuse plug, the major manufacturing requirement is that the final plug will pass the Underwriters Laboratory tests which specify that the adhesive used for the glass parts not give away after 30 days exposure to 100% humidity while being held at a temperature of 212° F. Thus, it has been found that the method set forth in this invention may be used to manufacture two-part fuse plugs which comply with the tests.

The method employed in preparing the glass laminate shown in FIG. 2 was as follows:

(1) A dry film of PVB having substantially no hydroxyl groups was prepared by dissolving about one mol of PVB and 0.1 mol of gamma aminopropyl triethoxysilane in dry dioxane. The dioxane was removed and dry films of the composition were obtained. The film thickness was held within 5 to 15 mils.

(2) Two clean glass plate surfaces were placed on opposite sides of a precut portion of the dry films prepared as mentioned above in (1).

(3) The stacked laminate formed was heated to a temperature sufficient to bring the film to the flow point to insure good wetting of the glass surfaces. The temperature was held at about 275–300° F. for a period of about 15 seconds at a pressure of between 10 and 15 p.s.i. This temperature range was sufficient for most PVB films which contained a plasticizer. For pure PVB, however, the flow point is substantially higher, at between 400° and 450° F., and the time required is less than 15 seconds.

(4) The final assembled and bonded laminate was cooled at room temperature. The shear strength of the bond achieved was generally lower than that achieved by the method described in preparing the structure of FIGURE 1, but nevertheless, adequate for employing same for various purposes described herein.

As previously stated, one of the advantages of using the above-described method wherein the films of PVB were formed is that the butyral can be precut to the desired size and handled by automatic machinery in both the cutting and the placing steps. Moreover, these films may be colored with known dyes or pigments to virtually any color or pattern or may be transparent, depending on the ultimate use to which the particular article being manufactured is to be used.

In determining the effectiveness of the invention, a series of tests were conducted to compare the assembled structures of this invention with structures wherein epoxy resins were used as the adhesive component. In these tests, the glass layers were divided into two groups, the first being treated with the solution of aminopropyl triethoxysilane as set out in the description in preparing the article of FIGURE 1, and the second group of connections being prepared by a method wherein no silane compound was used. The data from the tests is set out hereinbelow in Table I. Another series of tests were conducted to determine the effect of the presence of the hydroxyl groups in the PVB. One group of structures were prepared by using, for example, PVB, which were shown by infra-red analysis to be substantially free of hydroxyl groups. Another group of structures were prepared with PVB which contained, for example, 9–13 mol percent of hydroxyl groups. In both of these groups, the glass layers prepared with the composition having no silane pretreatment were compared with the structures produced in accordance with the method set forth hereinabove. The results of these tests are more particularly pointed out in Table II.

TABLE II.—SHEAR STRENGTH OF PVB LAMINATES

| Treatment of Slides | PVB (OH Free) p.s.i. | PVB (9-13%-OH) p.s.i. |
|---|---|---|
| 1 No silane pretreatment: | | |
| a PVB only | 915 | 1,887 |
| b Mixed silane and PVB | 1,580 | (¹) |
| c Mixed: 43%² plasticizer, PVB | | 1,585 |
| d Mixed: 21% plasticizer, PVB | | 1,780 |
| e Mixed: 15% plasticizer, PVB | | 1,800 |
| 2 Silane pretreatment: | | |
| a 0.5% solution: PVB | 1,540 | 2,877 |
| b 5% solution: PVB | | 2,835 |
| c 0.5% solution: PVB, silane mixed | 1,638 | (¹) |
| d 0.5% solution: PVB, 15% plasticizer | | 1,800 |

¹ Infusible resin.
² Triethylene glycol di (2-ethyl) butyrate.

In obtaining the data as set forth in Table I, clean, new, microscope slides were used as the glass plates for the manufacturing of the laminates to be tested. The slides were marked for an area equal to 0.64 square inch and the major adhesive component with a curing agent (when necessary) were applied and cured according to known methods for that particular resin. In the group of slides prepared from the use of the gamma aminopropyl triethoxysilane, the glass plates were first coated with a 0.5% solution in an aqueous medium of 70:30 water to alcohol and then allowed to dry. In each group of the slides prepared, ½ of the specimens were subjected to conditions for 30 days at 100% humidity at 212° F. The samples were subjected to a shear test carried out by placing the laminates in a compression shear apparatus specifically designed and constructed by Hazel-Atlas Glass Division of Continental Can Company, Inc. A Gynes engineering compression tester was used to apply a shear force to the specimens. The results of these compression shear strength tests are set out in Table I above.

In comparison, the data in Table I shows that a much quicker curing time may be used with the PVB and that when used in conjunction with a silane pretreatment, the shear strength compares favorably with the epoxy resin after 100% humidity exposure. In all of the epoxy resins used, it should be noted that two components were necessary prior to the application on the glass surfaces, thus incurring additional expenses. Moreover, the curing time of 15 seconds or less for the PVB as compared to the much longer curing times for the epoxy resins is an outstanding commercial advantage. Moreover, the film thickness of the PVB was greater than that of the epoxy resins and nevertheless, the glass plates using the PVB were secured together with less expense which particularly points out the desirable economic advantages of the instant invention.

As shown in the shear strength data, all of the adhesive resins tested, both with and without the silane pretreatment, exhibited high strengths prior to the 100% humidity conditioning. If no silane pretreatment was used, all of the adhesive resins tested failed after the 100% humidity exposure. The PVB shear strength after the condition-

TABLE I

| Resin Layer | No. of Reagents | Adhesive Catalyst | Plasticizer¹ Adhesive | Cure °F. | Cure Time | Film Thickness, mils | Shear Strength Prior to 30 days, 100% humidity | | Shear strength after 30 days, 100% humidity | |
|---|---|---|---|---|---|---|---|---|---|---|
| | | | | | | | Silane Pretreatment, p.s.i. | No Pretreatment, p.s.i. | Silane Pretreatment, p.s.i. | No Pretreatment, p.s.i. |
| PVB | 1 | | 15/85 | 275-300 | 15 sec | 5-8 | 1,800 | 1,800 | 1,100 | 0 |
| Epoxy No. 1 | 2 | 9/1 | | 250 | 5 min | 2-5 | 2,400 | 2,200 | 800 | 0 |
| Epoxy No. 2 | 2 | 1/1 | | 75 | 48 hr | 2-5 | 2,900 | 2,900 | 1,100 | 0 |
| Epoxy No. 3 | 2 | 100/7 | | 75 | 8 days | 2-5 | 2,500 | 2,500 | 890 | 0 |
| Epoxy No. 4 | 2 | 100/8 | | 300 | 1 hr | 2-5 | 2,500 | 2,500 | 1,800 | 0 |

¹ Triethylene glycol di (2-ethyl) butyrate.

ing compares favorably with the commercially available epoxy resins.

The term "curing time" is employed herein to designate the period for optimum strength of the epoxy resins and has been retained to show the heating time in which the PVB softens, conforms or bonds to the glass. Tests have shown that it is only necessary that the time and temperature applied be sufficient to soften the adhesive resin in order to obtain good wetting properties on the surface of the glass.

It can be seen from the data in Table II that the higher shear strengths are present when the silane pretreatment is used and in particular, improved results are obtained when PVB is used which contains hydroxyl groups.

While it is not completely understood, it may be theorized that the hydrogen atoms of the amino groups present in the silane are bonded to the ether oxygen of the PVB by hydrogen bonding. It does not appear that the aminoalkyl group in the silane breaks the ether oxygen link of the PVB. However, the high shear strength values for the adhesive layer wherein no hydroxyl groups are present in the PVB indicate some chemical action or molecular attraction. In selecting the silane, it is preferred that the amino group be removed from the silicone atoms of the silane by a sufficient number of methylene groups so that the amino group will not hydrolyze in the water:alcohol solutions as described herein. Thus, it has been found that the propyl group is of sufficient length to guard against hydrolysis and other aminoalkyl groups having up to about 12 carbon atoms per molecule may be used as the aminoalkyl substituent on the ethoxy silane.

The following table specifically points out other triethoxy silanes which may be used in accordance with this invention in combination with PVB having up to about 13% or more of hydroxyl groups:

TABLE III.—ADHESION SHEAR STRENGTH ON GLASS SLIDE [1]

| Polymer | Pretreatment | P.s.i. |
|---------|--------------|--------|
| PVB [2] | None | 1,200 |
| PVB | γ-Aminopropyl triethoxysilane | 1,700 |
| PVB | Methyl triethoxysilane | 1,930 |
| PVB | Vinyl triethoxysilane | 1,780 |
| PVB | Phenyl triethoxysilane | 1,760 |

[1] Each result is an average from 3 to 10 samples.
[2] PVB Polyvinylbutyral (9–13% OH).

The pretreatments from which the data in the above table were obtained comprise the application of the silane in an alcohol:water solution in amounts ranging from 0.5 to 5.0% by weight. The pretreated glass surfaces were allowed to dry for approximately 10 minutes. Subsequently, the pretreated glass slides were then heated for about 25 minutes at 210° C. When the slides cooled to about room temperature, a 16% polyvinyl butyral in dioxane was applied. These PVB slides were then allowed to dry at room temperature for about 48 hours.

It was noted that the slides prepared in accordance with the above procedure which were not pretreated demonstrated adhesive layer slippage. In such instances, the PVB merely slipped or pulled away from the glass surface. However, this did not occur in any of the glass slides that were pretreated in accordance with this invention and it may be deduced that the pretreatment causes the glass to be more firmly bound to the PVB adhesive. Thus, it appears that the amino group is not the only group that increases the shear strength of the glass-to-glass PVB adhesive. The shear strength did increase whenever a pretreatment was used and in no instance was there any demonstration of bond slippage. Thus, it is apparent that since the organo silicate ester was the only group present in the adhesive mass, the increase in shear strength must be due to the presence of the silane. This may be explained by the fact that instead of the amino group participating in hydrogen bonding with the ether oxygens, the silicate ester or silane may be reacting with the hydroxyl groups of the polymer forming chemical bonds that cause a greater strength between the PVB and the glass. The silicone oxygen forms its bonding with the alkaline surface of the glass while the silicate ester groups also react with the PVB. It is evident by the data in Table III that any of the silicate esters set forth in accordance with this invention will increase the shear strength or glass-to-glass adhesion when the PVB contains hydroxyl groups, e.g., up to 13% or more.

While this invention has been described with respect to a number of specific embodiments, it is obvious that there are other variations and modifications which can be resorted to without departing from the spirit of the invention, as particularly pointed out in the appended claims.

What is claimed is:

1. A method of preparing an assembled glass article which comprises treating first and second glass surfaces with an aqueous solution of a triethoxysilane containing a lower aliphatic alcohol and subsequently placing a film of polyvinyl butyral between said treated glass surfaces and pressing said glass surfaces together at a temperature approximating the flow point of the polyvinyl butyral; said triethoxysilanes being selected from the group consisting of aminoalkyl triethoxysilanes, alkyl triethoxysilanes, aryl triethoxysilanes, and vinyl triethoxysilanes.

2. The method of claim 1 further characterized in that the polyvinyl butyral has up to 13 mol percent of hydroxyl groups on the polymer chain.

3. The method of claim 1 further characterized in that the triethoxysilane is an aminopropyl triethoxysilane and the polyvinyl butyral is substantially free of hydroxyl groups.

4. The method of claim 1 further characterized in that the polyvinyl butyral contains an effective amount of plasticizer.

5. The method of claim 1 further characterized in that the polyvinyl butyral is substantially free of hydroxyl groups and contains therein up to 10 mol percent of an aminoalkyl triethoxysilane wherein the alkyl group has at least three carbon atoms.

6. The method of claim 1 further characterized in that the film of polyvinyl butyral is placed between the treated glass surfaces in thicknesses ranging from 5 to 15 mils.

7. The method of claim 1 further characterized in that the triethoxysilanes are present in the aqueous solution in amounts of about 0.5% to 5.0% by weight.

8. The method of claim 1 further characterized in that the aqueous solution of the triethoxysilane comprises a lower aliphatic alcohol in water in amounts ranging up to 30% by weight.

9. The process of claim 2 further characterized in that the triethoxysilane is an aryl triethoxysilane.

10. The method of claim 2 further characterized in that the triethoxysilane is a vinyl triethoxysilane.

11. A glass-polyvinylbutyral-glass article characterized by high-shear strength and high-moisture resistance which comprises at least two glass surfaces bonded together by an organic adhesive, said adhesive comprising a combination of a triethoxysilane and polyvinyl butyral on the inner surfaces of said glass; said triethoxysilane being selected from the group consisting of aminoalkyl triethoxylsilanes, alkyl triethoxysilanes, aryl triethoxysilanes, and vinyl triethoxysilanes.

12. The glass article of claim 11 further characterized in that the polyvinyl butyral has up to 13 mol percent of hydroxyl groups on the polymer chain.

13. The article of claim 12 further characterized in that the triethoxysilane is an alkyl triethoxysilane.

14. The article of claim 12 further characterized in that the triethoxysilane is an aryl triethoxysilane.

15. The article of claim 12 further characterized in that the triethoxysilane is vinyl triethoxysilane.

16. The article of claim 11 further characterized in that the polyvinyl butyral is substantially free of hydroxyl groups and the triethoxysilane is an aminoalkyl triethoxysilane.

17. A method of preparing an assembled glass article which comprises treating first and second glass surfaces with an aqueous solution of a triethoxysilane containing a lower aliphatic alcohol, heating the treated glass surfaces at temperatures ranging from 25° C. to 200° C. for periods ranging from about 10 minutes to 48 hours; subsequently placing a film of polyvinyl butyral between the treated glass surfaces and pressing said surfaces together at a temperature approximating the flow point of the polyvinyl butyral.

18. The method of claim 17 further characterized in that the treated glass surfaces are heated at a temperature of 25° C. to 50° C. for periods ranging from 2 to 48 hours.

19. The method of claim 17 further characterized in that the polyvinyl butyral contains up to about 13 mol percent of hydroxyl groups in the polymer chain.

20. The method of claim 19 further characterized in that the triethoxysilane is an alkyl triethoxysilane.

21. The method of claim 19 further characterized in that the triethoxysilane is an aryl triethoxysilane.

22. The process of claim 17 further characterized in that the polyvinyl butyral is substantially free of hydroxyl groups and the triethoxysilane is an aminoalkyl triethoxysilane containing at least three carbon atoms in the substituent.

References Cited

UNITED STATES PATENTS

| | | | |
|---|---|---|---|
| 2,763,629 | 9/1956 | Gottfurcht | 117—126 |
| 2,845,364 | 7/1958 | Waggoner | 117—46 |
| 3,160,551 | 12/1964 | Buetow et al. | 161—208 |

ALEXANDER WYMAN, *Primary Examiner.*

W. J. VAN BALEN, *Assistant Examiner.*